US008532369B2

(12) United States Patent
Chotard

(10) Patent No.: US 8,532,369 B2
(45) Date of Patent: Sep. 10, 2013

(54) METHOD AND DEVICE FOR REORDERING IMAGE DATA HAVING A DISTRIBUTION OF THE BAYER PATTERN TYPE

(75) Inventor: Ludovic Chotard, Saint Egreve (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 849 days.

(21) Appl. No.: 12/723,930

(22) Filed: Mar. 15, 2010

(65) Prior Publication Data

US 2010/0232687 A1 Sep. 16, 2010

(30) Foreign Application Priority Data

Mar. 16, 2009 (FR) ...................................... 09 01221

(51) Int. Cl.
*G06K 9/00* (2006.01)
(52) U.S. Cl.
USPC ......................................................... 382/162
(58) Field of Classification Search
None
See application file for complete search history.

(56) References Cited

U.S. PATENT DOCUMENTS

| | | | |
|---|---|---|---|
| 6,661,457 B1 | 12/2003 | Mathur et al. | |
| 7,573,508 B1* | 8/2009 | Kondo et al. | 348/224.1 |
| 7,733,396 B2* | 6/2010 | Pappalardo et al. | 348/273 |
| 7,742,521 B2* | 6/2010 | Vitali et al. | 375/240.03 |
| 8,106,957 B2* | 1/2012 | Kondo et al. | 348/222.1 |
| 2003/0183829 A1 | 10/2003 | Yamaguchi et al. | |
| 2005/0104982 A1 | 5/2005 | Shimazu et al. | |
| 2007/0146511 A1 | 6/2007 | Kinoshita et al. | |

* cited by examiner

*Primary Examiner* — Vikkram Bali
(74) *Attorney, Agent, or Firm* — Seed IP Law Group PLLC

(57) ABSTRACT

The present disclosure relates to a method for reordering data organized according to a matrix configuration, comprising steps of reading line by line input data having a matrix configuration to obtain an input data flow, and of processing a line of the input data involving: transferring into an output data flow a datum of the input data flow, belonging to the processed line, and transferring into the output data flow at least one datum of the input data flow stored beforehand, belonging to a previous line and having a same rank in the matrix configuration as the datum transferred from the processed line, and storing a datum of the input data flow belonging to the processed line and not transferred into the output data flow, to replace the transferred datum, belonging to a previous line.

18 Claims, 8 Drawing Sheets

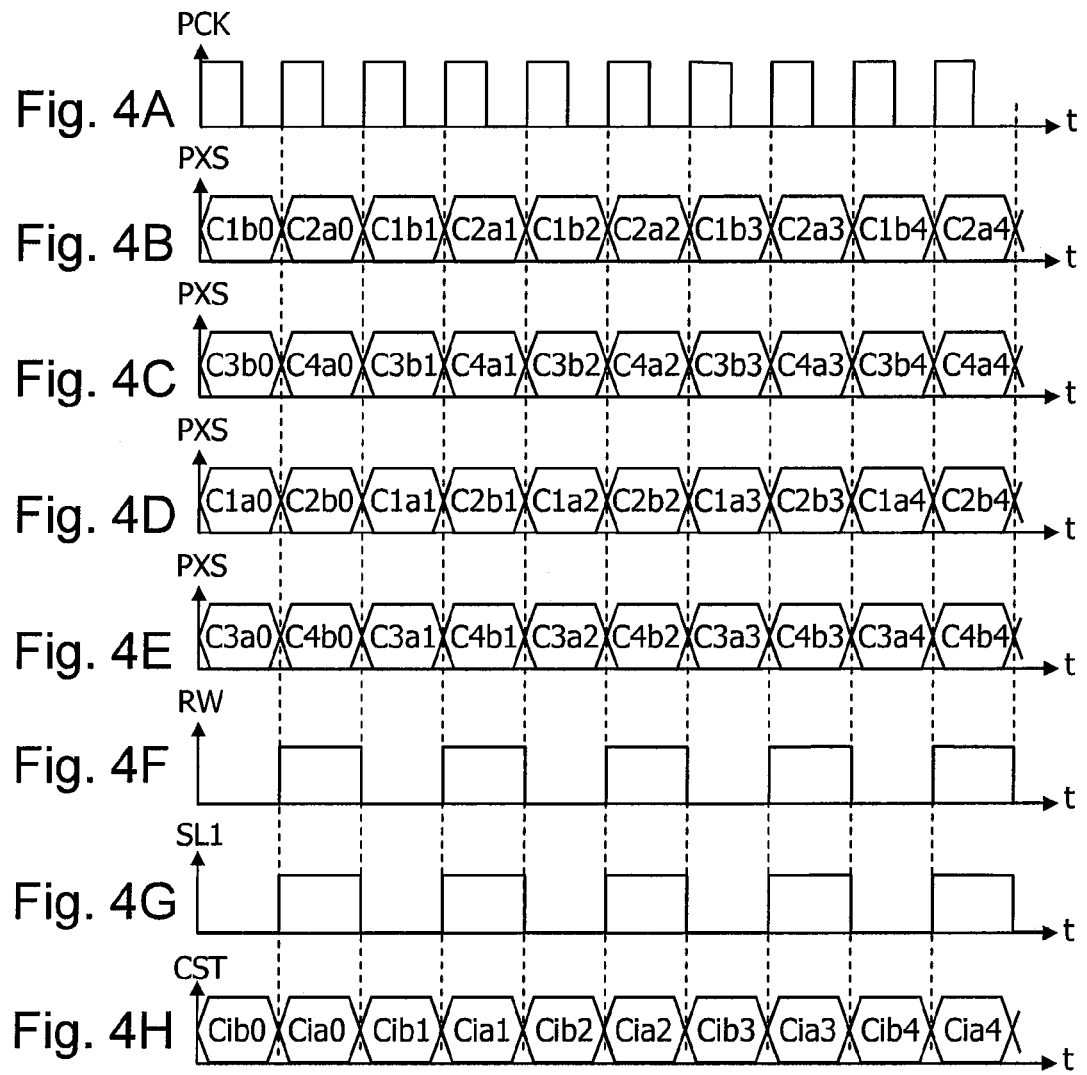

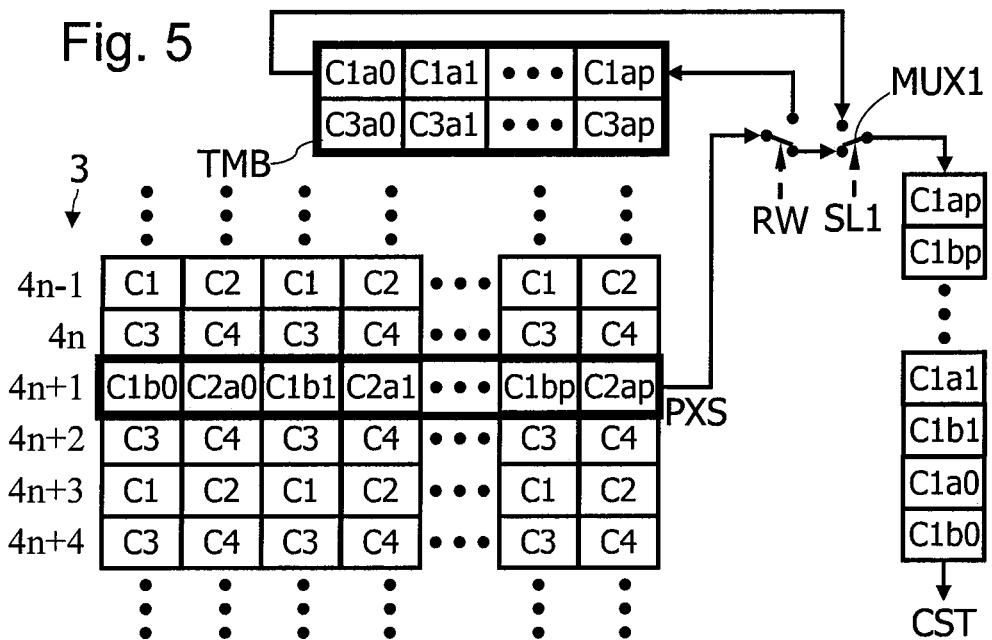
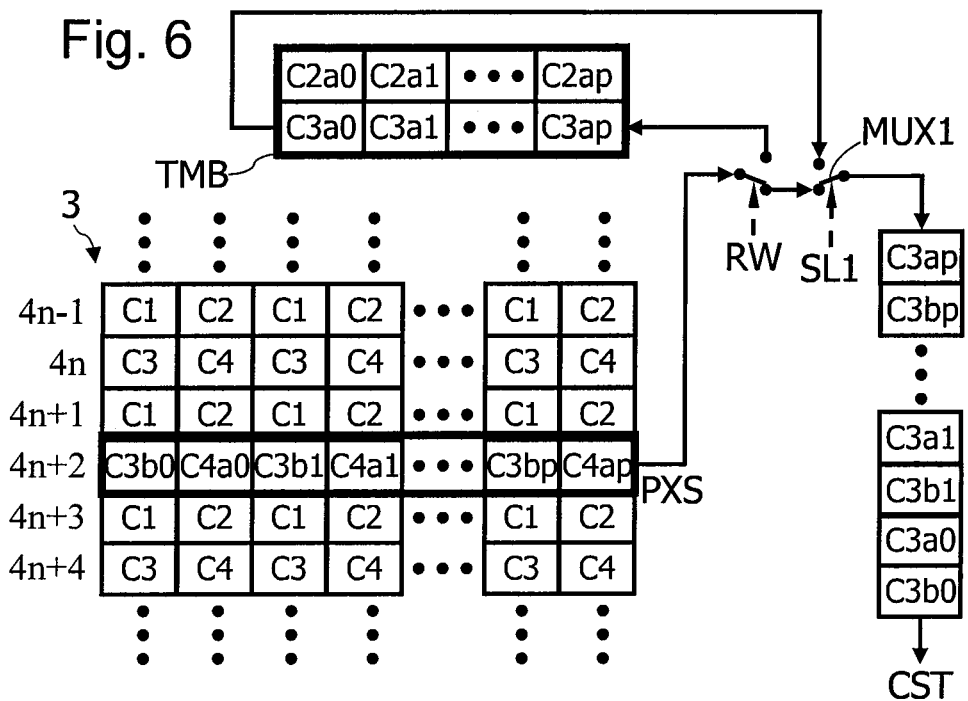

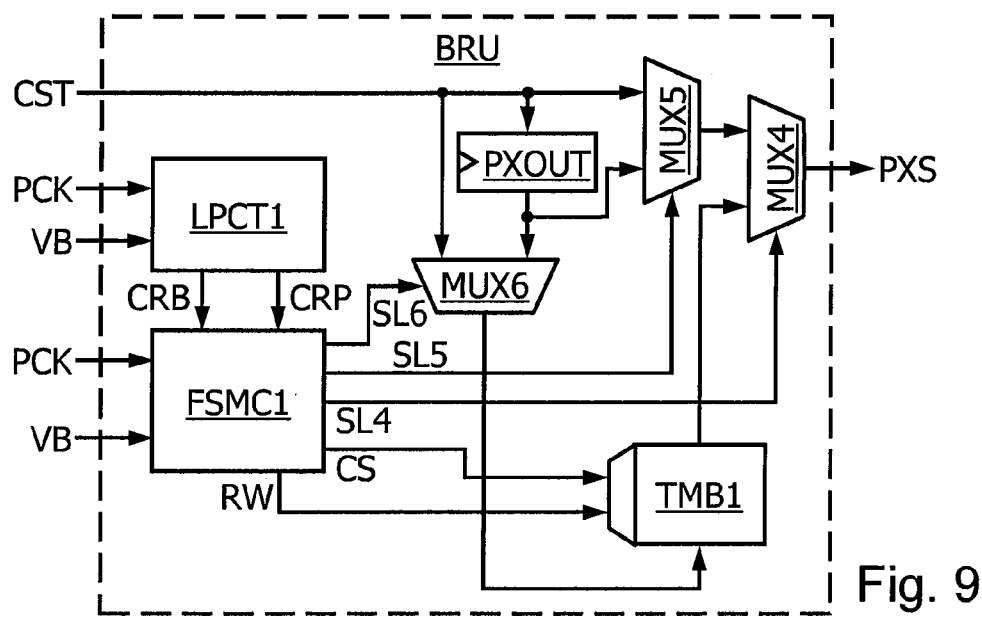
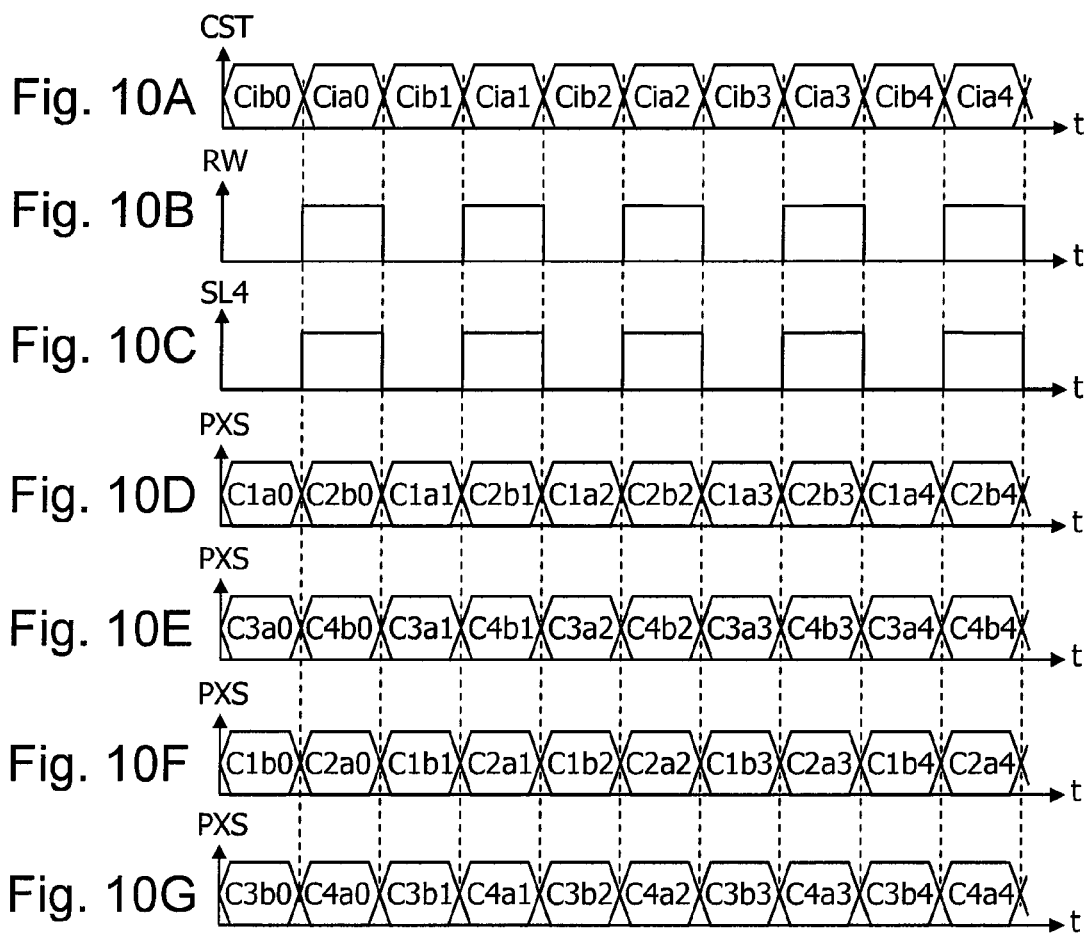

METHOD AND DEVICE FOR REORDERING IMAGE DATA HAVING A DISTRIBUTION OF THE BAYER PATTERN TYPE

BACKGROUND

1. Technical Field

The present disclosure relates to the processing of image data, and in particular, a process for separating the colors of an image coming from an image sensor.

2. Description of the Related Art

An image sensor generally has a matrix structure each element of which corresponds to a pixel of the image. The sensor is associated with a read circuit which sequentially supplies the value of each pixel by reading the value of each pixel line by line, from the pixel located in the top left-hand corner of the image to the pixel located in the bottom right-hand corner of the image for example. To supply a piece of color information, each pixel is associated with an elementary color filter having one of the three primary colors red, green, or blue. The primary color filters of the image sensor are distributed according to a color filter pattern which can be of the Bayer type. A color filter pattern of the Bayer type comprises a basic pattern of 2×2 pixels which is repeated in lines and in columns, so as to cover all the pixels of the image sensor. The basic pattern of a Bayer filter comprises a red primary filter associated, on a same line and a same column, with green primary filters, and a blue primary filter arranged diagonally in relation to the red filter, the two green primary filters possibly being identical or different. Thus, a basic Bayer pattern can have the following color distribution:

| R  | GR |
|----|----|
| GB | B  | in which R represents the red filter, GR the green filter on the same line as the red filter, B the blue filter and GB the green filter on the same line as the blue filter. In the following, the expression "color plane" means all the pixels of an image associated with a same primary filter color. An image supplied by an image sensor associated with a Bayer filter thus comprises four color planes, each corresponding to the color R, GR, GB, B of one of the four primary filters of the basic Bayer pattern.

Some image processing operations, and particularly the image compression processing operations, are typically preceded by process of separating the pixels of the image into color planes or of reorganizing the pixels in blocks or in segments each having pixels of several lines. Some of these processing operations do not apply to all the pixels of a color plane simultaneously, but to a few lines only. In some applications, it can be desirable for such a processing operation of color plane separation or reorganization to be performed on the fly, at the same rate as the pixels of the image coming from the image sensor are received, i.e., at the "pixel" frequency, to successively supply several lines of pixels of a same color plane or several blocks of pixels.

If the image processing applies to two successive lines of pixels from a same color plane of an image having a Bayer distribution, to perform the separation of color planes, two successive complete lines of the image can be stored, only one of the two lines having pixels of the color plane being separated. The separation process, in order to produce a block of two lines of a same color plane, can then be performed on the fly. That is, the separation process can be performed as and when the pixels of a third line, which comprises the pixels of a second line of the color plane, are received. It results therefrom that, during the storing of the first two complete lines of an image, the color plane separation process does not supply any pixel to the following process, such as an image compression process for example. After receiving a third image line, the separation process successively supplies two blocks of two image lines of the two color planes to which the third image line belongs. Upon receiving a fourth image line, the separation process successively supplies two blocks of two image lines of the two color planes to which the fourth image line belongs. If the image lines are desired to be supplied to the following processing operation at the rate at which the separation process receives the pixels, at least one of the two blocks of pixels of two color planes corresponding to two image lines can be stored and transmitted when the two complete image lines are stored.

More generally, if blocks from more than two successive lines of pixels of a same color plane are desired be supplied by the separation process, the number of lines of the image to be stored is equal to 2(n−1), n being the number of successive lines of pixels of a same color plane to be supplied.

In order to implement the process of separating the color planes by means of an integrated circuit, or more generally a process of reorganizing data in a data flow, it can be desirable to reduce the size of the memory and of the circuits employed to implement that process.

BRIEF SUMMARY

The present disclosure can apply to a flow of any data organized according to a matrix configuration in which each datum is spatially linked with adjacent right, left, top and bottom data, the data flow resulting from a line-by-line read of the data in the matrix configuration. Thus, the present disclosure can apply for example to a processing operation of reorganizing pixels of an image of RGB type to group the pixels of the image into blocks of n pixels in line and m pixels in column, in blocks of 8×2 or 8×16 pixels for example.

The present disclosure also relates to a reverse process of reconstituting an image as it would be supplied by an image sensor with a Bayer pattern, from blocks of pixels of successive color planes. Some applications are indeed designed to process images in which the pixels belonging to the different color planes have a distribution corresponding to a Bayer filter. It can also be desirable to reduce the size of the memory and of the circuits used to implement that reverse process.

One embodiment relates to a method for reordering data organized according to a matrix configuration, comprising a step of reading line by line input data having a matrix configuration to obtain an input data flow. According to one embodiment, the method comprises steps of processing a line of the input data involving: i) transferring into an output data flow a datum of the input data flow, belonging to the processed line, and transferring into the output data flow at least one datum of the input data flow stored beforehand, belonging to a previous line and having a same rank in the matrix configuration as the datum transferred from the processed line, and ii) storing a datum of the input data flow belonging to the processed line and not transferred into the output data flow, to replace the transferred datum, belonging to a previous line.

According to one embodiment, the method comprises steps of repeating the steps i) and ii) with a datum not already transferred or stored from the processed line, until all the data in the processed line are transferred or stored.

According to one embodiment, the data transferred into the output data flow belong successively and alternately to a same line and to a same previous line in the image.

According to one embodiment, one datum in two in the input data flow is transferred into the output data flow and the data of the input data flow not transferred into the output data flow are stored.

According to one embodiment, the data of the input data flow transferred into the output data flow are transferred into the output data flow in groups of at least one datum alternately with groups of at least one datum stored beforehand.

According to one embodiment, the input data are pixels of an image in which each line comprises pixels belonging to several color planes, the pixels being transferred into the output data flow in blocks all the pixels of which belong to a same color plane, the pixels stored during the transfer of a block into the output data flow belonging to a color plane that is different from the color plane of the pixels of the block transferred into the output data flow.

According to one embodiment, the image transmitted into the input data flow has a pixel distribution of the Bayer type, the method comprising steps of transferring into the output data flow the pixels of a line belonging to a same color plane alternately with pixels of the same color plane from a previous line of the image stored beforehand, and of storing the pixels of the line, belonging to another color plane.

According to one embodiment, the pixels of the output data flow have a matrix configuration in which all the pixels of each line in the matrix configuration belong to a same color plane.

According to one embodiment, the input data are pixels of an image in which all the pixels of each line belong to a single and same color plane, and the pixels of the output data flow have a distribution of the Bayer type, the method comprising steps of transferring into the output data flow, one pixel in two of a line belonging to a same color plane, alternately with pixels stored beforehand belonging to another and the same color plane, and of storing the pixels of the line being processed which are not transferred into the output data flow.

One embodiment also relates to a device for reorganizing data organized according to a matrix configuration, configured for implementing the method defined above.

According to one embodiment, the device comprises a temporary storage capacity limited to one line of data in the matrix configuration of the input data.

One embodiment also relates to a data flow, comprising a line comprising groups of at least one datum extracted from a same line of an original matrix configuration alternating with groups of at least one datum extracted from a same previous line of the original matrix configuration and having a same rank in the matrix configuration as the datum of a previous group in the line of the matrix configuration of the data flow.

According to one embodiment, each group of data comprises a single datum.

According to one embodiment, the original matrix configuration is that of an image having a distribution of the Bayer type, the line and the previous line of the original configuration being separated by a line of the original configuration.

BRIEF DESCRIPTION OF THE SEVERAL VIEWS OF THE DRAWINGS

Examples of embodiments of the present disclosure will be described below, in relation with, but not limited to, the accompanying Figures, in which:

FIGS. 4A to 4H are timing diagrams of signals illustrating the operation of the processing device represented in FIG. 3, FIGS. 5 to 8 represent the processing device of FIG. 3 at different steps of the processing of an image, FIG. 9 schematically represents a processing device performing a processing operation which is the reverse of the one in FIG. 3, FIGS. 10A to 10G are timing diagrams of signals illustrating the operation of the processing device represented in FIG. 9, FIGS. 11 to 14 represent the processing device in FIG. 9, at different steps of the processing of blocks of pixels of a same color plane.

DETAILED DESCRIPTION

Figure 1:
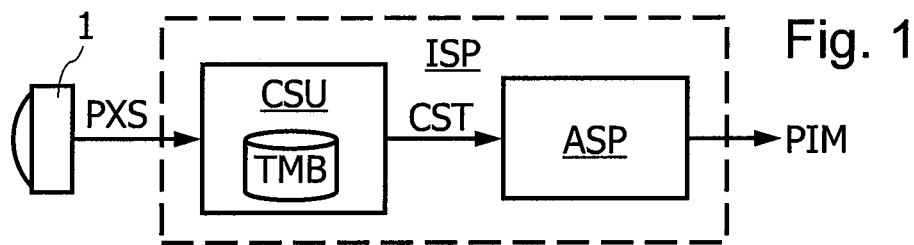
FIG. 1 schematically represents an image processing device connected to an image sensor.

FIG. 1 represents an image processing device ISP. The device ISP comprises a color separation unit CSU for separating the color planes connected to an image sensor 1 and a specific processing unit ASP connected to the unit CSU. The unit CSU receives a stream of pixels PXS from the image sensor 1, and supplies a stream of pixels CST grouped into blocks of pixels of a same color plane to the unit ASP. The unit ASP applies a process to the stream CST and supplies image data PIM. The unit ASP applies to the stream CST an image compression process for example, in order to transmit or store the images supplied by the sensor 1, or a process of filtering by color plane.

Figure 2:
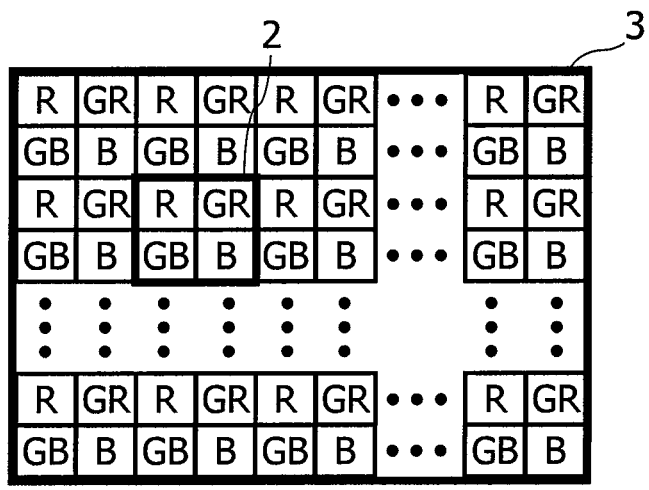
FIG. 2 represents an example of the pixel distribution of an image in different color planes, FIG. 3 schematically represents a separation processing device for separating the color planes of an image, according to one embodiment.

FIG. 2 represents an example of matrix distribution of color filters in lines and in columns on the light-sensitive surface of the sensor 1 or an example of distribution of the pixels in an image 3 supplied by the sensor 1. The distribution represented in FIG. 2 consists of a juxtaposition of identical Bayer patterns 2 of 4 pixels. In the example of FIG. 2, each pattern 2 comprises one red pixel R, one green pixel GR on the same line as the pixel R, one green pixel GB on the same column as the pixel R and one blue pixel B on the same line as the pixel GB.

Other arrangements of the pixels R, GR, B, GB in the pattern 2 are possible, as long as the two green pixels GR and GB are placed neither on the same line nor on the same column. Moreover, the image does not necessarily comprise an even number of lines or columns.

Figure 3:
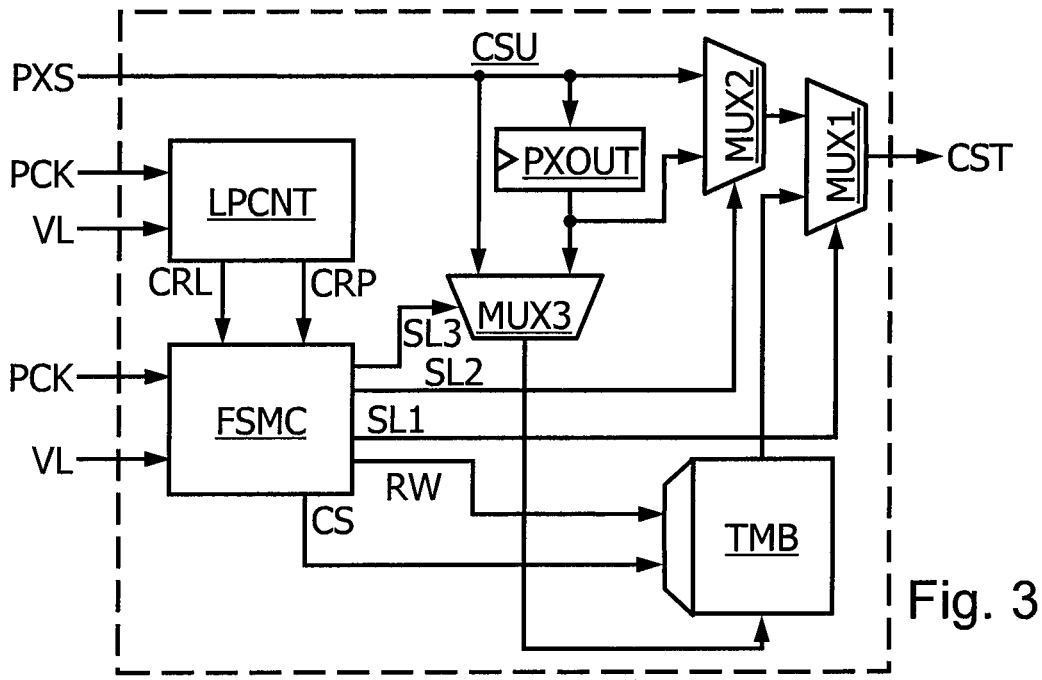

FIG. 3 represents the unit CSU for separating the color planes. The unit CSU comprises three multiplexers MUX1, MUX2, MUX3, a line and pixel counter LPCNT, a finite state machine FSMC, a pixel register PXOUT and a buffer memory TMB. The multiplexer MUX2 receives on an input the stream of pixels PXS coming from the image sensor 1 for example. The output of the multiplexer MUX2 is connected to an input of the multiplexer MUX1 which supplies at output the stream of pixels CST grouped into color plane blocks. The register PXOUT also receives at input the stream of pixels PXS. The output of the register PXOUT is connected to an input of the multiplexer MUX2 and to an input of the multiplexer MUX3. Another input of the multiplexer MUX3 also receives the stream of pixels PXS. The output of the multiplexer MUX3 is connected to a data input of the memory TMB a data output of which is connected to an input of the multiplexer MUX1. The counter LPCNT receives a clock signal at the "pixel" frequency PCK corresponding to the rate of the pixels in the stream PXS, and a start of image line signal VL, and supplies to the state machine FSMC a pixel number CRP in a current line and a line number CRL in a current image being received by the unit CSU. The state machine FSMC also receives the signals PCK and VL, as well as the numbers CRP and CRL, and supplies control signals SL1, SL2, SL3 to the multiplexers MUX1, MUX2 and MUX3, and activation signals CS and write and read command signals RW to the memory TMB. The memory TMB is configured for simultaneously performing a write operation and sending a datum for a read operation during a previous cycle. For that purpose, it comprises for example two units of FIFO type each capable of storing all the pixels of a half-line of the image 3. The register PXOUT is also configured for simultaneously performing a read and a write operation of a pixel.

FIGS. 4A to 4H represent timing diagrams of signals transiting in the unit CSU. FIG. 4A represents the timing diagram of the pixel clock signal PCK. FIGS. 4B, 4C, 4D, 4E represent timing diagrams of the pixel signal PXS depending on the line number in the image. FIG. 4B represents the signal PXS upon the arrival of a line of rank 4n+1 of an image, containing pixels of color C1 and C2 (n being an integer comprised between 0 and the number of lines of the image divided by 4). In a line of rank 4n+1, the pixels C1 are transferred into the output data flow of the unit CSU. FIG. 4C represents the signal PXS upon the arrival of a line of rank 4n+2 of the image, containing pixels of color C3 and C4. In a line of rank 4n+2, the pixels C3 are transferred into the output data flow of the unit CSU. FIG. 4D represents the signal PXS upon the arrival of a line of rank 4n+3 of the image, containing pixels of color C1 and C2. In a line of rank 4n+2, the pixels C2 are transferred into the output data flow of the unit CSU. FIG. 4E represents the signal PXS upon the arrival of a line of rank 4n+4 of the image, containing pixels of color C3 and C4. In a line of rank 4n+4, the pixels C4 are transferred into the output data flow of the unit CSU. FIGS. 4F and 4G represent timing diagrams of the signals RW and SL1. The signals RW and SL1 which change state at each cycle of the signal PCK are in phase. FIG. 4H represents a timing diagram of the output signal CST. The output signal CST comprises blocks of pixels a and b of a same color Ci (=C1, C2, C3 or C4) belonging to two lines of the image 3, separated by a single other line, the pixels a and b of the two lines appearing in the block alternately.

The operation of the state machine FSMC is described in the following in reference to FIGS. 5 to 8 which represent the image 3, and particularly the line of the image being received by the unit CSU, the content of the memory TMB and the content of the output data flow CST. In the image 3 represented on FIGS. 5 to 8, the colors of the Bayer pattern are referenced C1, C2, C3, C4. The memory TMB has a capacity corresponding to two half-lines of the image 3, and thus comprises two memory zones each for storing the pixels of a same color plane belonging to a same line of the image 3.

FIG. 5 represents the state of the unit CSU at the beginning of the receipt of a line 4n+1 of the image 3, n being an integer comprised between 0 and the number of lines of the image divided by 4. The line 4n+1 comprises pixels of color C1 alternating with pixels of color C2. The pixels of color C1 of the line 4n+1 are numbered from C1$b$0 to C1$bp$, and the pixels of color C2 of that line are numbered from C2$a$0 to C2$ap$, p being the number of pixels of color C1 or C2 in the line 4n+1, i.e., the number of pixels of a half-line of the image 3. Just before the receipt of the first pixel C1$b$0 of the line 4n+1 begins, the memory TMB stores, in a first line, the pixels of color C1 of the line 4n−1 of the image 3, numbered from C1$a$0 to C1$ap$, and in a second line, the pixels of color C3 of the line 4n, numbered from C3$a$0 to C3$ap$:

TMB(1)=[C1$a$0 . . . C1$ap$] and TMB(2)=[C3$a$0 . . . C3$ap$].

When the number of the line CRL is equal to 4n+1, the state machine FSMC controls the multiplexer MUX2 so that it links the input PXS to the input of the multiplexer MUX1, and controls the multiplexer MUX3 so that it links the input PXS to the input of the memory TMB. Upon the first cycle of the clock signal PCK, the state machine FSMC is configured for ordering the supply of the first pixel C1$b$0 of the line 4n+1, as soon as it is received by the unit CSU, into the output data flow CST:

C1$b$0→CST //TMB(1)=[C1$a$0 . . . C1$ap$].

Upon the second cycle of the clock signal PCK, the first pixel C1$a$0 of the first line of the memory TMB is transferred into the output data flow CST, and the second pixel received by the unit CSU, i.e., a pixel C2$a$0, is stored in the memory TMB:

C1$a$0→CST and C2$a$0→TMB //TMB(1)=[C1$a$1 . . . C1$ap$/C2$a$0].

The state machine FSMC is configured for repeating the operations performed during these two cycles until the last pixel C2$ap$ of the line 4n+1 is received, which is stored in the memory TMB:

| | |
|---|---|
| C1$b$1→CST | // TMB(1)=[C1$a$1..C1$ap$/C2$a$0] |
| C1$a$1→CST and C2$a$1→TMB | // TMB(1)=[C1$a$2..C1$ap$/C2$a$0/C2$a$1] |
| ... | |
| C1$bp$→CST | // TMB(1)=[C1$ap$/C2$a$0..C2$a$(p−1)] |
| C1$ap$→CST and C2$ap$→TMB | // TMB(1)=[C2$a$0..C2$ap$]. |

All the pixels of color C1 of the lines 4n+1 and 4n−1 have thus been transferred alternately into the stream CST, while all the pixels of color C2 of the line 4n+1 have been stored in the memory TMB in place of the pixels of color C1 of the line 4n−1.

Moreover, while the first line of the image 3 is being received, the memory TMB does not contain the pixels of a previous line of the same colors of the same image 3. The state machine FSMC can thus be configured for duplicating the pixels of color C1 of the line 1 (n=0) of the image in the output data flow CST of the unit CSL.

FIG. 6 represents the state of the unit CSU at the beginning of the receipt of a line 4n+2 of the image 3. The line 4n+2 comprises pixels of color C3 alternating with pixels of color C4. The pixels of color C3 of the line 4n+2 are numbered from C3$b$0 to C3$bp$, and the pixels of color C4 of that line are numbered from C4$a$0 to C4$ap$. Just before the receipt of the first pixel C3$b$0 of the line 4n+2 begins, the memory TMB stores, in a first line, the pixels of the line 4n+1 having the color C2, numbered from C2$a$0 to C2$ap$, and in a second line, the pixels having the color C3 of the line 4n, numbered from C3$a$0 to C3$ap$:

TMB(1)=[C2$a$0 . . . C2$ap$] and TMB(2)=[C3$a$0 . . . C3$ap$].

The processing of the line 4n+2 is identical to that of the line 4n+1, apart from the fact that the second line of the memory TMB is gradually read and loaded with the pixels $C4a0$ to $C4ap$ of the line 4n+2:

```
C3b0→CST                    // TMB(2)=[C3a0..C3ap]
C3a0→CST and C4a0→TMB       // TMB(2)=[C3a1..C3ap/C4a0]
C3b1→CST                    // TMB(2)[C3a1..C3ap/C4a0]
C3a1→CST and C4a1→TMB       // TMB(2)=[C3a2..C3ap/C4a0/C4a1]
...
C3bp→CST                    // TMB(2)=[C3ap/C4a0..C4a(p-1)]
C3ap→CST and C4ap→TMB       // TMB(2)=[C4a0..C4ap].
```

After receiving the last pixel $C4ap$ of the line 4n+2, all the pixels of color C3 of the lines 4n+2 and 4n have thus been transferred alternately into the stream CST, while all the pixels of color C4 of the line 4n+2 have been stored in the memory TMB in place of the pixels of color C3 of the line 4n.

Moreover, while the second line of the image 3 is being received, the memory TMB does not contain the pixels of a previous line of the same colors of the same image 3. The state machine FSMC can therefore be configured for duplicating in the output data flow CST of the unit CSL the pixels of color C3 of the line 2 (n=0) of the image.

Figure 7:
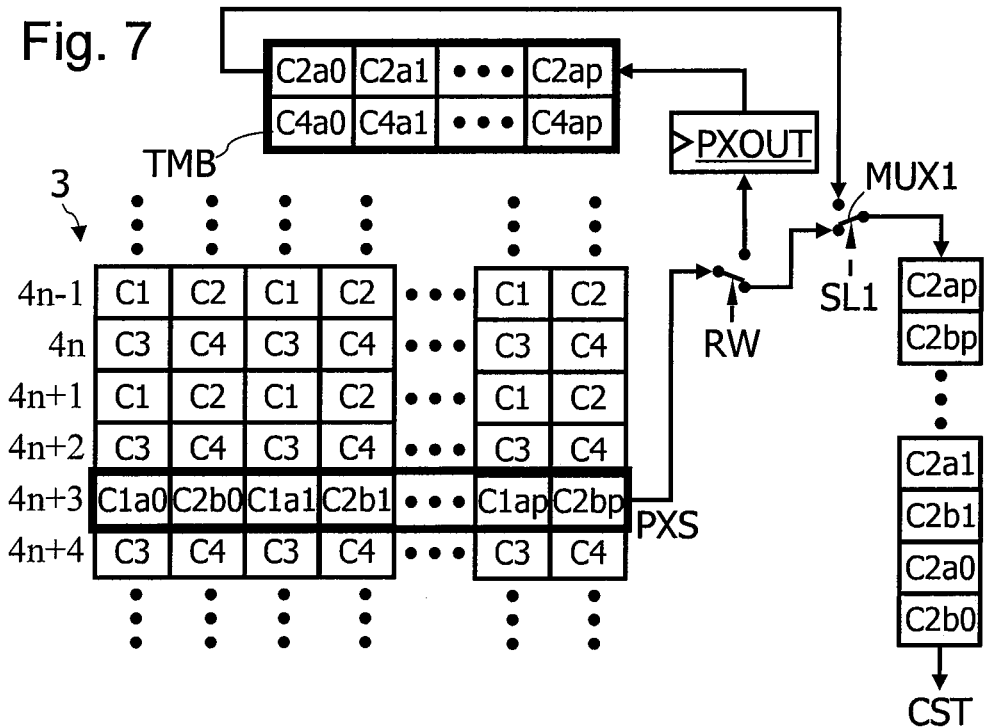

FIG. 7 represents the state of the unit CSU at the beginning of the receipt of a line 4n+3 of the image 3. The line 4n+3 comprises pixels of color C1, numbered from $C1a0$ to $C1ap$ alternating with pixels of color C2, numbered from $C2b0$ to $C2bp$. Just before the receipt of the first pixel $C1a0$ of the line 4n+3 begins, the memory TMB stores, in a first line, the pixels of color C2 of the line 4n+1, numbered from $C2a0$ to $C2ap$, and in a second line, the pixels of color C4 of the line 4n+2, numbered from $C4a0$ to $C4ap$.

TMB(1)=[$C2a0 \ldots C2ap$] and TMB(2)=[$C4a0 \ldots C4ap$].

All the pixels of color C2 of the lines 4n+1 and 4n+3 have thus been transferred into the output data flow CST, while all the pixels of color C1 of the line 4n+3 have been stored in the memory TMB in place of the pixels of color C2 of the line 4n+1.

Figure 8:
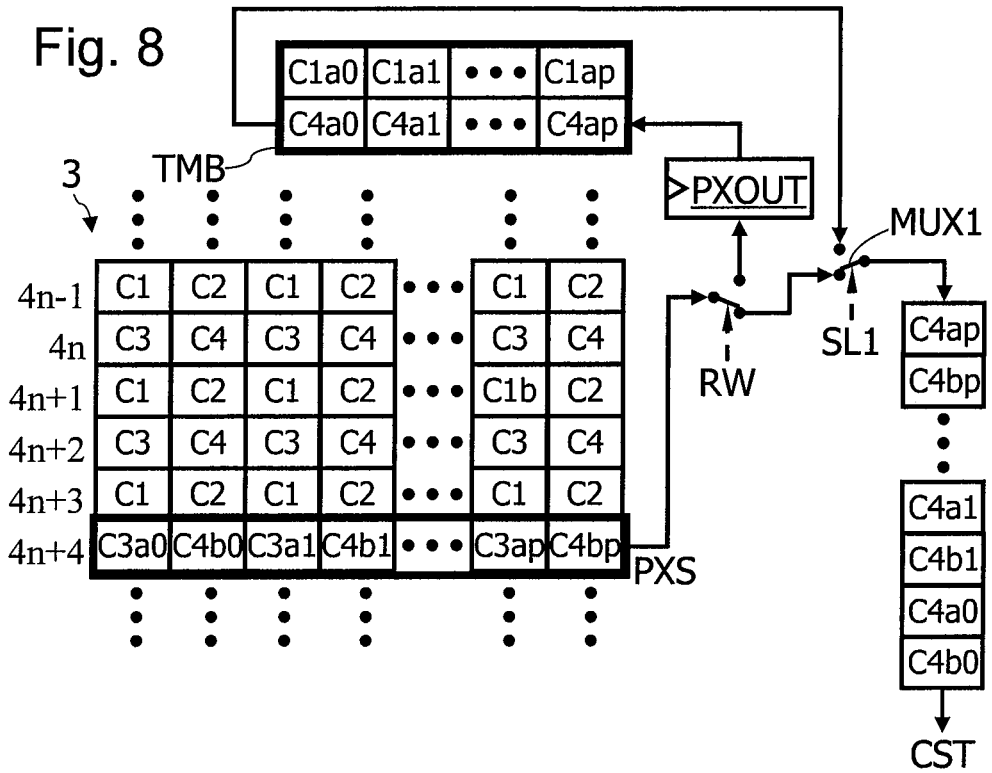

FIG. 8 represents the state of the unit CSU at the beginning of the receipt of a line 4n+4 of the image 3. The line 4n+4 comprises pixels of color C3, numbered from $C3a0$ to $C3ap$, alternating with pixels of color C4, numbered from $C4b0$ to $C4bp$. Just before the receipt of the first pixel $C3a0$ of the line 4n+4 begins, the memory TMB stores, in a first line, the pixels of color C1 of the line 4n+3, numbered from $C1a0$ to $C1ap$, and in a second line, the pixels of color C4 of the line 4n+2, numbered from $C4a0$ to $C4ap$:

TMB(1)=[$C1a0 \ldots C1ap$] and TMB(2)=[$C4a0 \ldots C4ap$].

The processing of the line 4n+4 is identical to that of the line 4n+3, apart from the fact that the second line of the memory TMB is gradually read and loaded with the pixels $C3a0$ to $C3ap$ of the line 4n+4:

```
C3a0→PXOUT                           // TMB(2)=[C4a0..C4ap]
C4b0→CST                             // TMB(2)=[C4a0..C4ap]
C4a0→CST and C3a0→TMB and C3a1→PXOUT
                                     // TMB(2)[C4a1..C4apC3a0]
C4b1→CST                             // TMB(2)[C4a1..C4apC3a0]
C4a1→CST and C3a1→TMB and C3a2→PXOUT
                                     // TMB(2)=[C4a2..C4apC3a0C3a1]
...
C4bp→CST                             // TMB(2)=[C4apC3a0..C3a(p-1)]
C4ap→CST and C3ap→TMB                // TMB(2)=[C3a0..C3ap].
```

After receiving the last pixel $C4bp$ of the line 4n+4, all the pixels of color C4 of the lines 4n+2 and n+3 are thus transferred alternately into the output data flow CST, while all the pixels of color C3 of the line 4n+4 have been stored in the memory TMB in place of the pixels of color C4 of the line 4n+2.

When the number of the line CRL is equal to 4n+3, the state machine controls the multiplexer MUX2 so that it links the input PXS to the input of the multiplexer MUX1, and the multiplexer MUX3 so that it links the output of the register PXOUT to the input of the memory TMB. Upon the first cycle of the clock signal PCK, the state machine FSMC is configured for ordering the transfer of the first pixel received $C1a0$ into the register PXOUT:

$C1a0$→PXOUT //TMB(1)=[$C2a0 \ldots C2ap$].

Upon the second cycle of the clock signal PCK, the pixel received $C2b0$ is supplied at output CST, as soon as it is received by the unit CSU:

$C2b0$→CST //TMB(1)=[$C2a0 \ldots C2ap$].

Upon the third cycle of the clock signal PCK, the first pixel $C2a0$ of the first line of the memory TMB is transferred into the output data flow CST, the first pixel received by the unit CSU, i.e., the pixel $C1a0$, is transferred from the register PXOUT into the memory TMB, and the third pixel received $C1a1$ is transferred into the register PXOUT:

```
C2a0→CST and C1a0→TMB and C1a1→PXOUT
                              // TMB(1)=[C2a1..C2ap/C1a0].
```

The state machine FSMC is configured for repeating the operations performed during these last two cycles until the last pixel $C2ap$ of the line 4n+3 is received, which is transferred into the output data flow CST:

```
C2b1→CST                    // TMB(1)=[C2a1..C2ap/C1a0].
C2a1→CST and C1a1→TMB and C1a2→PXOUT
                            // TMB(1)=[C2a2..C2ap/C1a0/C1a1].
...
C2bp→CST                    // TMB(1)=[C2ap/C1a0..C1a(p-1)]
C2ap→CST and C1ap→TMB       // TMB(1)=[C1a0..C1ap].
```

In the FIGS. 5 to 8, the unit CSU first supplies into the output data flow CST the first or the second pixel $Cib0$ of the line of the image 3 being received, then the pixel $Cia0$ of a previous line of the image stored in the memory TMB. The output data flow thus comprises a succession of lines belonging successively to the four color planes of the initial image.

The state machine FSMC can also be configured for first supplying the first pixel stored $Cia0$, then the first pixel $Cib0$ of the image line being received. For that purpose, at the beginning of the receipt of a line of rank 4n+1 or 4n+2 of the image 3, the state machine FSMC controls the multiplexer MUX2 so that it links the output of the register PXOUT to the input of the multiplexer MUX1, and the multiplexer MUX3 so that it links the input PXS to the input of the memory TMB. Before receiving a line of rank 4n+3 or 4n+4 of the image 3, the state machine FSMC controls the multiplexer MUX2 so that it links the input PXS to the input of the multiplexer MUX1, and the multiplexer MUX3 so that it links the input PXS to the input of the memory TMB. It will be understood that the multiplexer MUX2 is of no use and can be removed if the order of the pixels ai and bi in the output data flow CST is fixed.

Thus, the unit CSU can group the pixels into blocks of pixels of a same color plane belonging to two image lines while storing only two half-image lines, i.e., the equivalent of one image line. It shall also be noted that the unit CSU supplies the pixels ordered by block in the output data flow CST at the same rate as the rate of the input data flow PXS.

The unit CSU can also be configured for grouping in segments of several pixels, the pixels stored in the memory TMB and the pixels of the image line being received before transferring the pixels into the output data flow CST. Thus, the pixels in the output data flow CST can have the following order:

$$Cib0/Cib1/.../Cib(k-1)/Cia0/Cia1/.../Cia(k-1)/Cibk/.../(Cib2k-1)/Ciak/.../Cia(2k-1)/....$$

wherein k represents the number of pixels per segment. The unit CSU thus comprises an additional buffer memory or the register PXOUT is extended for storing k pixels during the time for the pixels of a previous segment to be transmitted into the output data flow CST.

FIG. 9 represents a processing unit BRU for reconstituting an image having the Bayer distribution from the stream of pixels CST grouped into blocks of pixels of the same color. The unit BRU comprises three multiplexers MUX4, MUX5, MUX6, a finite state machine FSMC1, a line and pixel counter LPCT1, a pixel register PXOUT1 and a buffer memory TMB1. The multiplexer MUX5 receives at one input the stream of pixels CST coming, for example, from an image processing unit, such as an image compression unit for example. The output of the multiplexer MUX5 is connected to an input of the multiplexer MUX4 which supplies at output a stream of pixels PXS of an image having a Bayer distribution, the stream PXS successively comprising the pixels of each line of the image. The register PXOUT1 also receives at input the stream of pixels CST. The output of the register PXOUT1 is connected to an input of the multiplexer MUX6 another input of which also receives the stream of pixels CST. The output of the multiplexer MUX6 is connected to a data input of the memory TMB1 a data output of which is connected to an input of the multiplexer MUX4. The counter LPCT1 receives a clock signal at the "pixel" frequency PCK corresponding to the rate of the pixels in the stream CST, and a signal indicating the beginning of an image color block VB, and supplies to the state machine FSMC1 a pixel number CRP in a current color block and a block number CRB in a current image being received by the unit BRU. The state machine FSMC1 also receives the signals PCK and VB, as well as the numbers CRP and CRB, and supplies control signals SL4, SL5 and SL6 to the multiplexers MUX4, MUX5, MUX6, and activation signals CS and read and write command signals RW to the memory TMB1. The memory TMB1 is configured for simultaneously performing a write operation and sending a datum for a read operation during a previous cycle. For that purpose, it comprises two units, of FIFO type for example, each capable of storing all the pixels of a half-color block received in the stream CST. The register PXOUT1 is also configured for simultaneously performing a read and a write operation of a pixel.

FIGS. 10A to 10H represent timing diagrams of signals transiting in the unit BRU. FIG. 10A represents the timing diagram of the flow of color blocks CST. FIGS. 10B and 10C represent timing diagrams of the signals RW and SL4. The signals RW and SL4 which change state upon each arrival of a pixel are in phase in the stream CST. FIGS. 10D, 10E, 10F, 10G represent timing diagrams of the output signal PXS according to the block number of the image. FIG. 10D has the signal PXS upon the arrival of a block of pixels of color C1, the pixels C1$ai$ being transferred into the output data flow PXS of the unit BRU alternately with pixels C2$bi$ of color C2 stored beforehand in the memory TMB1. FIG. 10E represents the signal PXS upon the arrival of a block of pixels of color C3, the pixels C3$ai$ being transferred into the output data flow of the unit BRU with pixels C4$bi$ stored beforehand in the memory TMB1. FIG. 10F represents the signal PXS upon the arrival of a block of pixels of color C2, the pixels C2$ai$ being transferred into the output data flow of the unit BRU alternately with pixels C1$bi$ stored beforehand in the memory TMB1. FIG. 10G represents the signal PXS upon the arrival of a block of pixels of color C4, the pixels C4 being transferred into the output data flow of the unit BRU alternately with pixels C2$bi$ stored beforehand in the memory TMB1.

The operation of the state machine FSMC1 is described in the following with reference to the FIGS. 11 to 14 which represent a block of color C1, C2, C3 or C4 of the stream CST being received by the unit BRU, the content of the memory TMB1 and the content of the output data flow PXS. The memory TMB1 has a capacity corresponding to two half-lines of the image 3 or two half-color blocks, and thus comprises two memory zones each for storing the pixels of a same color block.

Figure 11:
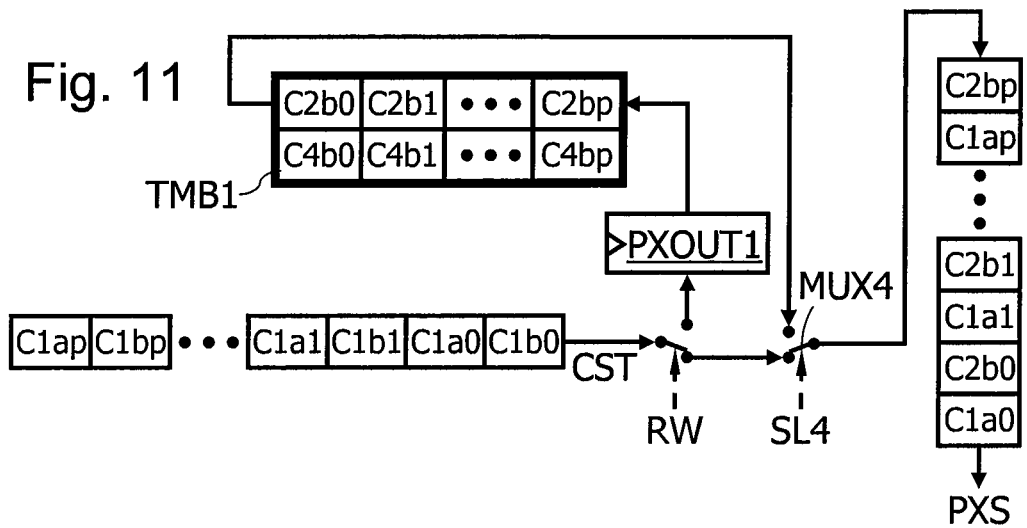

FIG. 11 represents the state of the unit BRU at the beginning of the receipt of a block of pixels of color C1 comprising pixels numbered from C1$b$0 to C1$bp$ (p being the number of pixels of a half-color block or a half-line of the image 3) belonging to a same line of the image 3, alternately with pixels numbered from C1$a$0 to C1$ap$ belonging to a previous line of the image. The block of color C1 begins with the pixel C1$b$0. Just before the receipt of the first pixel C1$b$0 begins, the memory TMB1 stores, in a first line, pixels of color C2, numbered from C2$b$0 to C2$bp$, and in a second line, pixels of color C4, numbered from C4$b$0 to C4$bp$:

TMB1(1)=[C2$b$0 . . . C2$bp$] and TMB1(2)=[C4$b$0 . . . C4$bp$].

The state machine FSMC1 controls the multiplexer MUX5 so that it links the input CST to the input of the multiplexer MUX4, and controls the multiplexer MUX6 so that it links the output of the register PXOUT1 to the input of the memory TMB1. Upon the arrival of the first pixel C1$b$0 of the block of color C1, the state machine FSMC1 is configured for ordering the transfer of that pixel into the register PXOUT1, as soon as it is received by the unit BRU:

C1$b$0→PXOUT1 //TMB1(1)=[C2$b$0 . . . C2$bp$].

Upon the arrival of the second pixel C1$a$0, the state machine FSMC1 is configured for ordering the transfer of that pixel into the output data flow PXS:

C1$a$0→PXS //TMB1(1)=[C2$b$0 . . . C2$bp$].

Upon the arrival of the third pixel C1$b$1, the state machine is configured for simultaneously ordering the transfer of the pixel C2$b$0 from the memory TMB1 to the output data flow PXS, the transfer of the pixel C1$b$0 from the register PXOUT1 to the memory TMB1, and the transfer of the pixel received C1$b$1 into the register PXOUT1:

C2$b$0→PXS and C1$b$0→TMB1 and C1$b$1→PXOUT1
// TMB1(1)=[C2$b$1..C2$bp$/C1$b$0].

The state machine FSMC1 is configured for repeating the operations performed during these last two cycles until the last pixel C1$ap$ of the block of color C1 is received, which is transferred into the output data flow PXS. The content of the register PXOUT1, i.e., the pixel C1*bp*, is then transferred into the memory TMB1, and the pixel C2*bp* is transferred from the memory TMB1 to the output data flow PXS:

| | |
|---|---|
| C1a1→PXS | // TMB1(1)[C2b1..C2bp/C1b0] |
| C2b1→PXS and C1b1→TMB1 and C1b2→PXOUT1 | |
| | // TMB1(1)[C2b2..C2bp/C1b0/C1b1] |
| ... | |
| C1ap→PXS | // TMB1(1)=[C2bp/C1b0..C1b(p−1)] |
| C2bp→PXS and C1bp→TMB1 | // TMB1(1)=[C1b0..C1bp]. |

An image line containing pixels of color C1 alternating with pixels of color C2 is thus reconstituted in the output data flow PXS, while the pixels C1*b*0 to C1*bp* have been stored in the memory TMB1 in place of the pixels C2*b*0 to C2*bp*.

Moreover, if the first block of color C1 of an image contains pixels duplicated two by two, the memory TMB1 thus not storing the pixels of a previous block of color C2 of the same image, the state machine FSMC1 can be configured for storing in the memory TMB1 one pixel of color C1 out of two, without transferring pixels into the output data flow PXS.

Figure 12:
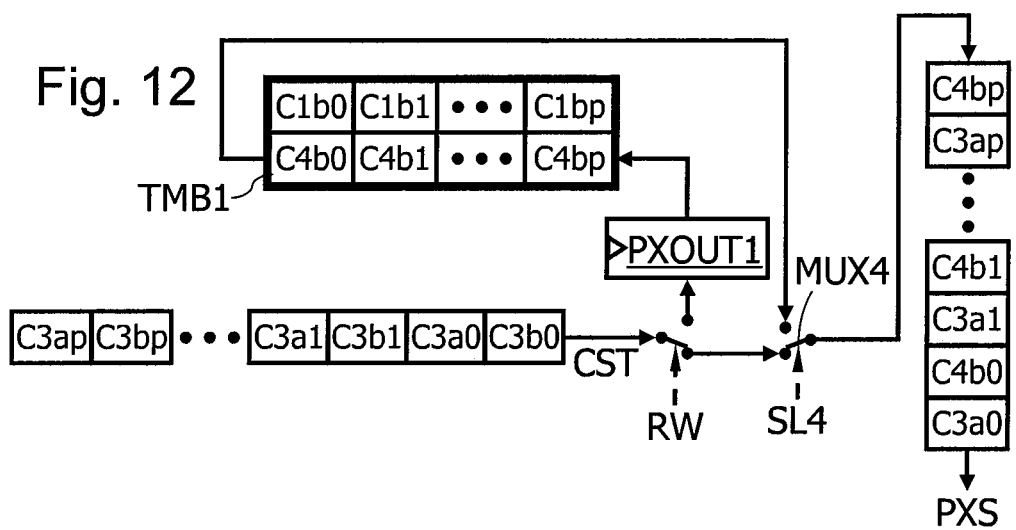

FIG. 12 represents the state of the unit BRU at the beginning of the receipt of a block of pixels of color C3 comprising pixels numbered from C3*b*0 to C3*bp* belonging to a same line of an image, alternately with pixels numbered from C3*a*0 to C3*ap* belonging to a previous line of the image. The block of color C3 begins with the pixel C3*b*0. Just before the receipt of the first pixel C3*b*0 begins, the memory TMB1 stores, in a first line, pixels of color C1, numbered from C1*b*0 to C1*bp*, and in a second line, pixels of color C4, numbered from C4*b*0 to C4*bp*:

TMB1(1)=[C1*b*0 . . . C1*bp*] and TMB1(2)=[C4*b*0 . . . C4*bp*].

The state machine FSMC1 controls the multiplexer MUX5 so that it links the input CST to the input of the multiplexer MUX4, and controls the multiplexer MUX6 so that it links the output of the register PXOUT1 to the input of the memory TMB1. Upon the arrival of the first pixel C3*b*0 of the block of color C3, the state machine FSMC1 is configured for ordering the transfer of that pixel into the register PXOUT1, as soon as it is received by the unit BRU:

C3*b*0→PXOUT1 //TMB1(2)=[C4*b*0 . . . C4*bp*].

Upon the arrival of the second pixel C3*a*0, the state machine FSMC1 is configured for ordering the transfer of that pixel into the output data flow PXS:

C3*a*0→PXS //TMB1(2)=[C4*b*0 . . . C4*bp*].

Upon the arrival of the third pixel C3*b*1, the state machine is configured for simultaneously ordering the transfer of the pixel C4*b*0 from the memory TMB1 to the output data flow PXS, the transfer of the pixel C3*b*0 from the register PXOUT1 to the memory TMB1, and the transfer of the pixel received C3*b*1 into the register PXOUT1:

| |
|---|
| C4*b*0→PXS and C3*b*0→TMB1 and C3*b*1→PXOUT1 |
| // TMB1(2)=[C4*b*1..C4*bp*/C3*b*0]. |

The state machine FSMC1 is configured for repeating the operations performed during these two cycles until the last pixel C3*ap* of the block of color C3 is received, which is transferred into the output data flow PXS. The pixel C4*bp* is then transferred from the memory TMB1 to the output data flow PXS and the content of the register PXOUT1, i.e., the pixel C3*bp*, is transferred into the memory TMB1:

| | |
|---|---|
| C3a1→PXS | // TMB1(2)=[C4b1..C4bp/C3b0] |
| C4b1→PXS and C3b1→TMB1 and C3b2→PXOUT1 | |
| | // TMB1(2)=[C4b2..C4bp/C3b0/C3b1] |
| ... | |
| C3ap→PXS | // TMB1(2)=[C4bp/C3b0..C3b(p−1)] |
| C4bp→PXS and C3bp→TMB1 | // TMB1(2)=[C3b0..C3bp]. |

An image line containing pixels of color C3 alternating with pixels of color C4 is thus reconstituted in the output data flow, while the pixels C3*b*0 to C3*bp* have been stored in the memory TMB1 in place of the pixels C4*b*0 to C4*bp*.

Moreover, if the first block of color C3 of an image contains pixels duplicated two by two, the memory TMB1 thus not storing the pixels of a previous block of color C4 of the same image, the state machine FSMC1 can be configured for storing in the memory TMB1 one pixel of color C3 out of two, without transferring any pixel into the output data flow PXS.

Figure 13:
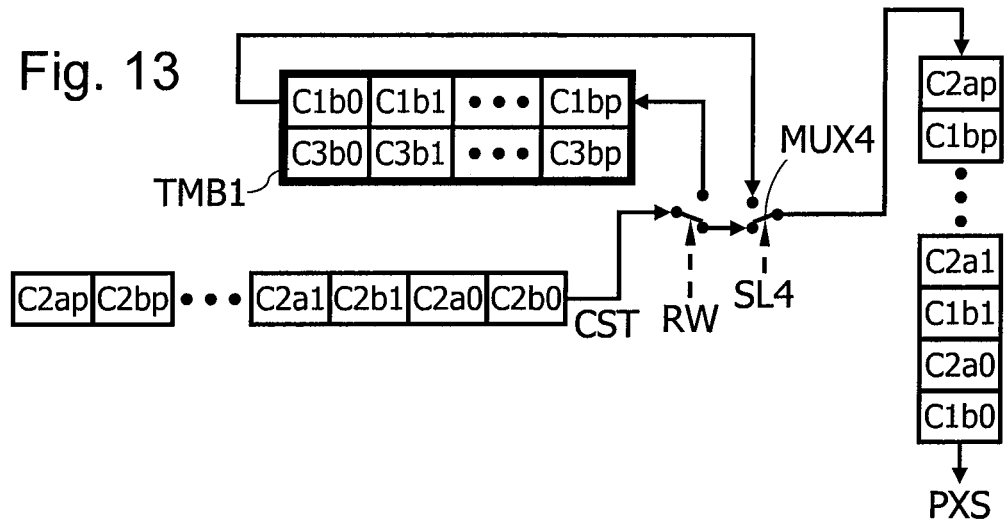

FIG. 13 represents the state of the unit BRU at the beginning of the receipt of a block of pixels of color C2 comprising pixels numbered from C2*b*0 to C2*bp* belonging to a same line of an image, alternately with pixels numbered from C2*a*0 to C2*ap* belonging to a previous line of the image. The block of color C2 begins with the pixel C2*b*0. Just before the receipt of the first pixel C2*b*0 begins, the memory TMB1 stores, in a first line, pixels of color C1, numbered from C1*b*0 to C1*bp*, and in a second line, pixels of color C3, numbered from C3*b*0 to C3*bp*:

TMB1(1)=[C1*b*0 . . . C1*bp*] and TMB1(2)=[C3*b*0 . . . C3*bp*]

The state machine FSMC1 controls the multiplexer MUX5 so that it links the input CST to the input of the multiplexer MUX4, and controls the multiplexer MUX6 so that it links the input CST to the input of the memory TMB1. Upon the arrival of the first pixel C2*b*0 of the block of color C2, the state machine FSMC1 is configured for ordering the transfer of the pixel C1*b*0 from the memory TMB1 towards the output data flow PXS, and simultaneously, the transfer of the pixel C2*b*0 into the memory TMB1 as soon as it is received by the unit BRU:

C1*b*0→PXS and C2*b*0→TMB1 //TMB1(1)=[C1*b*1 . . . C1*bp*/C2*b*0].

Upon the arrival of the second pixel C2*a*0, the state machine FSMC1 is configured for ordering the transfer of that pixel into the output data flow PXS, as soon as it is received by the unit BRU:

C2*a*0→PXS //TMB1(1)=[C1*b*0 . . . C1*bp*/C2*b*0].

The state machine FSMC1 is configured for repeating the operations performed during these two cycles until the last pixel C2*ap* of the block of color C2 is received, which is transferred into the output data flow PXS:

| | |
|---|---|
| C1b1→PXS and C2b1→TMB1 | // TMB1(1)=[C1b2..C1bp/C2b0/C2b1] |
| C2a1→PXS | // TMB1(1)=[C1b2..C1bp/C2b0/C2b1] |
| ... | |
| C1bp→PXS and C2bp→TMB1 | // TMB1(1)= [C2b0..C2bp] |
| C2ap→PXS | // TMB1(1)= [C2b0..C2bp]. |

An image line containing pixels of color C1 alternating with pixels of color C2 is thus reconstituted in the output data flow, while the pixels C2*b*0 to C2*bp* have been stored in the memory TMB1 in place of the pixels C1*b*0 to C1*bp*.

Figure 14:
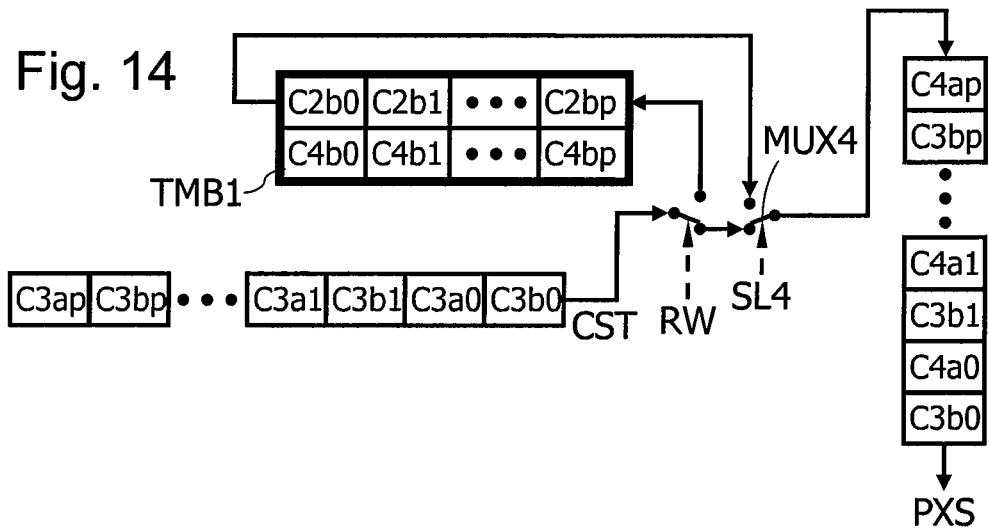

FIG. 14 represents the state of the unit BRU at the beginning of the receipt of a block of pixels of color C4 comprising pixels numbered from C4*b*0 to C4*bp* belonging to a same line of an image, alternately with pixels numbered from C4a0 to C4ap belonging to a previous line of the image. The block of color C4 begins with the pixel C4b0. Just before the receipt of the first pixel C4b0 begins, the memory TMB1 stores, in a first line, pixels of color C2, numbered from C2b0 to C2bp, and in a second line, pixels of color C3, numbered from C3b0 to C3bp:

TMB1(1)=[C2b0 . . . C2bp] and TMB1(2)=[C3b0 . . . C3bp]

The state machine FSMC1 controls the multiplexer MUX5 so that it links the input CST to the input of the multiplexer MUX4, and controls the multiplexer MUX6 so that it links the input CST to the input of the memory TMB1. Upon the arrival of the first pixel C4b0 of the block of color C4, the state machine FSMC1 is configured for ordering the transfer of the pixel C3b0 from the memory TMB1 towards the output data flow PXS, and simultaneously, the transfer of the pixel C4b0 into the memory TMB1 as soon as it is received by the unit BRU:

C3b0→PXS and C4b0→TMB1 //TMB1(2)=[C3b1 . . . C3bp/C4b0].

Upon the arrival of the second pixel C4a0, the state machine FSMC1 is configured for ordering the transfer of that pixel into the output data flow PXS as soon as it is received by the unit BRU:

C4a0→PXS //TMB1(2)=[C3b0 . . . C3bp/C4b0].

The state machine FSMC1 is configured for repeating the operations performed during these two cycles until the last pixel C4ap of the block of color C4 is received, which is transferred into the output data flow:

| | |
|---|---|
| C3b1→PXS and C4b1→TMB1 | // TMB1(2)=[C3b2..C3bp/C4b0/C4b1] |
| C4a1→PXS | // TMB1(2)=[C3b2..C3bp/C4b0/C4b1] |
| ... | |
| C3bp→PXS and C4bp→TMB1 | // TMB1(2)= [C4b0..C4bp] |
| C4ap→PXS | // TMB1(2)= [C4b0..C4bp]. |

An image line containing pixels of color C3 alternating with pixels of color C4 is thus reconstituted in the output data flow PXS, while the pixels C4b0 to C4bp have been stored in the memory TMB1 in place of the pixels C3b0 to C3bp.

In FIGS. 11 and 12, if, in the input data flow CST of the unit BRU, the pixel C1a0 or C3a0 arrives before the pixel C1b0 or C3b0, the state machine FSMC1 controls the multiplexer MUX5 so that it links the input CST to the input of the multiplexer MUX4, and controls the multiplexer MUX6 so that it links the input CST to the input of the memory TMB1. In FIGS. 13 and 14, if, in the input data flow CST of the unit BRU, the pixel C2a0 or C4a0 arrives before the pixel C2b0 or C4b0, the state machine FSMC1 controls the multiplexer MUX5 so that it links the output of the register PXOUT1 to the input of the multiplexer MUX4, and controls the multiplexer MUX6 so that it links the input CST to the input of the memory TMB1. It will be understood that the multiplexer MUX5 is of no use and can be removed if the order of the pixels ai and bi in the input data flow CST is fixed.

Figure 15:
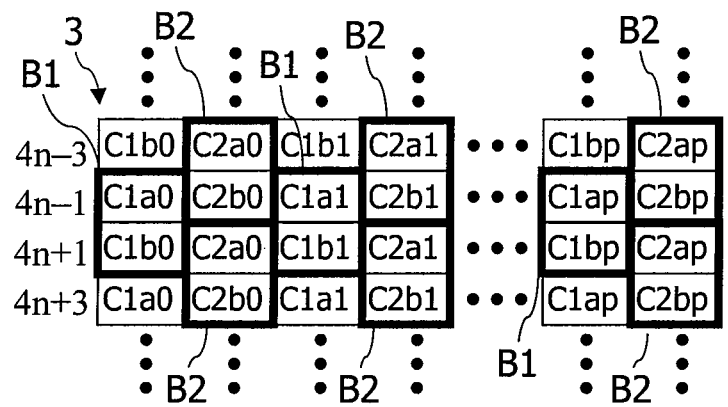
FIG. 15 represents a portion of the image of FIG. 3, in which the pixels are grouped into blocks of two segments of 1 pixel in width.
Figure 16:
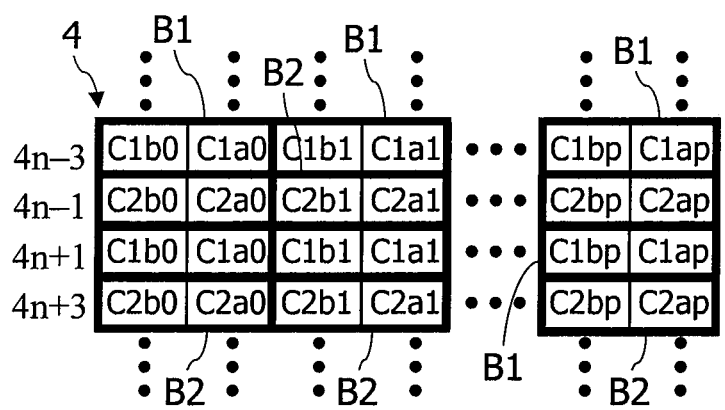
FIG. 16 represents the portion of the image of FIG. 15 after undergoing the color plane separation process.

FIG. 15 represents a portion of the image 3 having only the uneven ranked lines of the image. The processing performed by the unit CSU previously described enables each pixel C1bj of color C1 from a line of rank 4n+1 of the image 3 to be grouped into blocks B1 of two line segments of one pixel length, with the adjacent pixel C1aj of the same color from the line of rank 4n−1, and each pixel C2aj of color C2 from the line of rank 4n+1 to be grouped into blocks B2 with the adjacent pixel C2bj of the same color from the line of rank 4n+3. FIG. 16 represents a portion of an image 4 resulting from the process of separating the color planes of the image 3. In that image, the two pixels of each block B1, B2 are ranked on a same line.

The present disclosure can also apply to a stream of any data resulting from a line-by-line read of data organized according to a matrix configuration in which each datum is spatially linked with neighboring right, left, top and bottom data. Thus, the present disclosure can apply to the pixels or only to one primary color component of an image of RGB type in which each pixel comprises a red component, a green component and a blue component.

Figure 17:
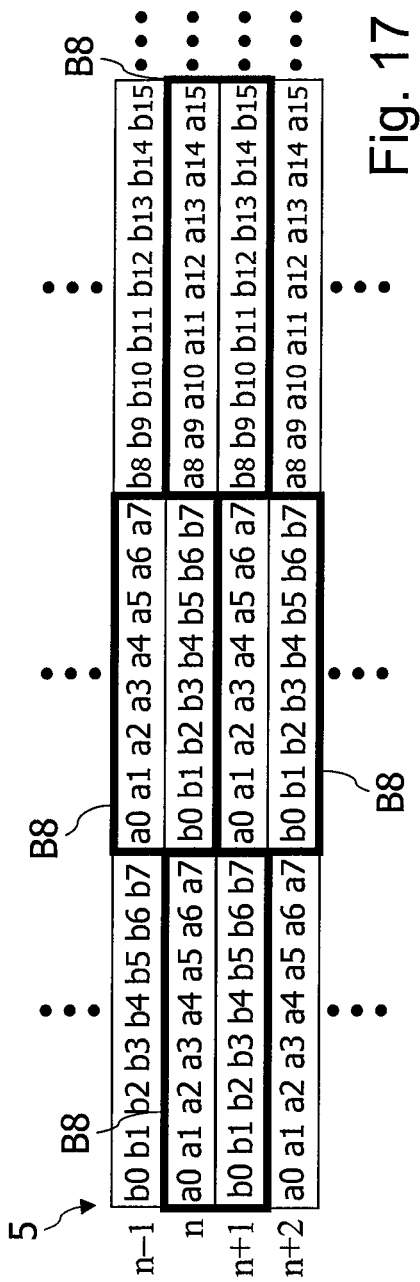
FIG. 17 represents a part of a set of data in which the data are grouped into segments of eight data in width.

FIG. 17 represents an input data flow organized according to a matrix configuration 5, the unit CSU being configured for grouping the data of the input data flow into blocks B8 of two adjacent line segments, of eight data b0 . . . b7, a0 . . . a7 for example, the first segment belonging to a line n, and the second segment belonging to a previous line n−1 in the data stream.

The unit CSU comprises a temporary memory TA which stores, at the beginning of the processing of a line n, half the data a0 . . . ap of the previous line n−1:

TA=[l(n−1)a0 . . . ap].

The unit CSU also comprises a temporary memory TB enabling a quarter of the pixels of a segment to be assembled to be stored. The unit CSU is configured for performing the processing of the line n as follows.

The first eight data a0 . . . a7 of the line n received in the input data flow are stored in the memory TA as and when they are received by the unit CSU, the memory TB being empty:

| | |
|---|---|
| a0→TA // TA=[l(n−1)a0..ap/l(n)a0] // TB = [ ] | |
| ... | |
| a7→TA | // TA=[l(n−1)a0..ap/l(n)a0..a7] // TB = [ ]. |

The following datum b0 of the line n is transmitted as soon as it is received by the unit CSU into the output data flow CST:
b0→CST.

Then the following datum b1 of the line n is stored temporarily in the memory TB, as soon as it is received. In parallel, the datum a0 of the line n−1 stored beforehand in the first memory line TA is transmitted into the output data flow:

b1→TB and a0→CST //TA=[l(n−1)a1 . . . ap/l(n)a0 . . . a7]//TB=[b1].

The following datum b2 of the line n is received by the unit CSU and stored temporarily, while the datum b1 is transmitted into the output data flow.

b2→TB and b1→CST //TA=[l(n−1)a1 . . . ap/l(n)a0 . . . a7]//TB=[b2].

The following datum b3 of the line n is then received and stored temporarily, while the stored datum a1 is transmitted into the output data flow:

| | |
|---|---|
| b3→TB and a1→CST | // TA=[l(n−1)a2..ap/l(n)a0..a7] |
| // TB=[b2b3] and so on and so forth: | |
| b4→TB and b2→CST | // TA=[l(n−1)a2..ap/l(n)a0..a7] |
| // TB=[b3b4] | |
| b5→TB and a2→CST | // TA=[l(n−1)a3..ap/l(n)a0..a7] |
| // TB=[b3..b5] | |
| b6→TB and b3→CST | // TA=[l(n−1)a3..ap/l(n)a0..a7] |
| // TB=[b4..b6] | |
| b7→TB and a3→CST | // TA=[l(n−1)a4..ap/l(n)a0..a7] |
| // TB=[b4..b7]. | |

Then, the following data a8 ... a15 of the line n are received and stored in the second memory line TMB(2), while the data present in the first memory line TMB(1) are transmitted in the output data flow:

| | |
|---|---|
| a8→TA and b4→CST | // TA=[l(n−1)a4..ap/l(n)a0..a8] // TB=[b5..b7] |
| a9→TA and a4→CST | // TA=[l(n−1)a5..ap/l(n)a0..a9] // TB=[b5..b7] |
| a10→TA and b5→CST | //TA=[l(n−1)a5..ap/l(n)a0..a10] //TB=[b6b7] |
| a11→TA and a5→CST | //TA=[l(n−1)a6..ap/l(n)a0..a11] //TB=[b6b7] |
| a12→TA and b6→CST | // TA=[l(n−1)a6..ap/l(n)a0..a12] // TB=[b7] |
| a13→TA and a6→CST | // TA=[l(n−1)a7..ap/l(n)a0..a13] // TB=[ b7] |
| a14→TA and b7→CST | // TA=[l(n−1)a7..ap/l(n)a0..a14] // TB=[ ] |
| a15→TA and a7→CST | // TA=[l(n−1)a8..ap/l(n)a0..a15] // TB=[ ]. |

The process performed by the unit CSU then goes on with the arrival and the processing of data b8 to b15 of the line n in a manner similar to the processing of data b0 to b7. When the processing of the line n is complete, the memory TA stores all the data a0 to ap of the line n, and all the data b0 ... bp of the line n have been transmitted in the output data flow with the data a0 ... ap of the line n−1.

The unit CSU thus requires a temporary storage capacity enabling less than one line of the input data flow to be stored, i.e., the data of a half-line and of a segment (data ai), and the data of a half-segment (data bi) at the most. Here again, the data rate in the output data flow CST is identical to the rate of the data in the input data flow.

Figure 18:
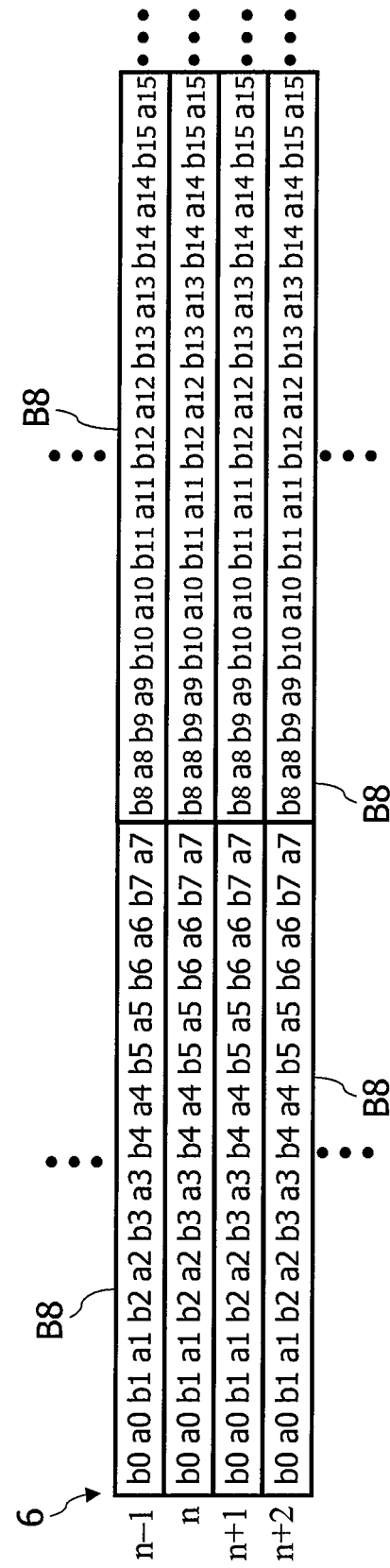
FIG. 18 represents the part of the set of data of FIG. 17 after undergoing a processing operation of modifying the distribution data, according to one embodiment.

FIG. 18 represents a matrix organization 6 resulting from the processing performed by the unit CSU. In that image, the pixels of each block B8 are arranged on a same line, and ordered so as to come successively and alternately from a line n (pixels bi) and from a previous line n−1 (pixels ai).

As above, the present disclosure also relates to a process which is the reverse of the one that has just been described, involving the generation of a data stream in which the data ai, bi in the blocks B8 are placed in the initial order again as represented in FIG. 16. Such a reverse process does not require more temporary memory, as shown by the processing of a line n described in the following.

At the beginning of the receipt of the line n, the memory TA stores the pixels bi of the line n−1:
TA=[l(n−1)b0 ... bp].
The data of the line n are received in the following order:
b0a0b1a1 ... bpap
the data bi belonging to the line n and the data ai belonging to the line n−1.

The processing operations performed on the line n can be the following:

| | |
|---|---|
| b0→TA | // TA=[l(n−1)b0..bp/l(n)b0] // TB=[ ] |
| a0→TB | // TA=[l(n−1)b0..bp/l(n)b0] // TB=[a0] |
| b1→TA | // TA=[l(n−1)b0..bp/l(n)b0] // TB=[a0] |
| a1→TB | // TA=[l(n−1)b0..bp/l(n)b0] // TB=[a0a1] |
| b2→TA | // TA=[l(n−1)b0..bp/l(n)b0] // TB=[a0a1] |
| a2→TB | // TA=[l(n−1)b0..bp/l(n)b0] // TB=[a0a1a2] |
| b3→TA | // TA=[l(n−1)b0..bp/l(n)b0] // TB=[a0a1a2] |
| a3→TB | // TA=[l(n−1)b0..bp/l(n)b0] // TB=[a0a1a2a3] |
| b4→TA and a0→PXS | // TA=[l(n−1)b0..bp/l(n)b0] // TB=[a1a2a3] |
| a4→TB and a1→PXS | // TA=[l(n−1)b0..bp/l(n)b0] // TB=[a2a3a4] |
| b5→TA and a2→PXS | // TA=[l(n−1)b0..bp/l(n)b0] // TB=[a3a4] |
| a5→TB and a3→PXS | // TA=[l(n−1)b0..bp/l(n)b0] // TB=[a4a5] |
| b6→TA and a4→PXS | // TA=[l(n−1)b0..bp/l(n)b0] // TB=[a5] |
| a6→TB and a5→PXS | // TA=[l(n−1)b0..bp/l(n)b0] // TB=[a6] |
| b7→TA and a6→PXS | // TA=[l(n−1)b0..bp/l(n)b0..b7] // TB=[ ] |
| a7→PXS | // TA=[l(n−1)b0..bp/l(n)b0..b7] // TB=[ ] |
| b8→TA and b0→PXS | // TA=[l(n−1)b1..bp/l(n)b0..b8] // TB=[ ] |

-continued

| | |
|---|---|
| a8→TB and b1→PXS | // TA=[l(n−1)b2..bp/l(n)b0..b8] // TB=[a8] |
| ... | |
| b15→TA and b7→PXS | // TA=[l(n−1)b8..bp/l(n)b0..b15] // TB=[a8..a14] |
| a15→TB and a8→PXS | // TA=[l(n−1)b8..bp/l(n)b0..b15] // TB=[a9..a15] |
| ... | |
| bp→TA and a(p−1)→PXS | // TA=[l(n−1)b(p−7)..bp/l(n)b0..bp] // TB=[ ] |
| ap→PXS | // TA=[l(n−1)b(p−7)..bp/l(n)b0..bp] // TB=[ ] |
| b(p−7)→PXS | // TA=[l(n−1)b(p−6)..bp/l(n)b0..bp] // TB=[ ] |
| ... | |
| bp→PXS | // TA=[l(n)b0..bp] // TB=[ ]. |

It will be clearly understood by those skilled in the art that the present disclosure is susceptible of different variations and applications. In particular, the present disclosure can be provided for constituting blocks grouping data distributed over more than two lines of the data matrix configuration, for example over three or four lines.

In the example of FIGS. 17 and 18, distributions of data can also be provided in the output data flow of the unit CSU other than a distribution of the type b0a0b1a1 ... comprising successively and alternately one datum bi coming from a line and one datum ai coming from a previous line (stored beforehand). Thus, a distribution such as b0 ... bk/a0 ... ak/b(k+1) ... can be provided.

It can also be provided to process only part of the data. Thus, in the example of an image having a configuration of Bayer type, it can be provided to extract only part of the four color planes, and thus only the pixels belonging to the color planes to be extracted.

Moreover, the present disclosure can apply to distributions of data in a matrix configuration other than a distribution of the Bayer type. Each line in the matrix configuration can thus group data belonging to more than two color planes, or more generally, more than two categories. It is also possible for the lines not to group data of different categories as in the Bayer-type distribution, but data of the same category. The different categories of data can also be distributed over more than two consecutive lines unlike the Bayer-type distribution.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method, comprising:
    reordering input data organized according to a matrix configuration, the reordering including:
        reading line by line the input data having the matrix configuration to obtain an input data flow; and
        processing a current line of the input data flow, the processing including:
            transferring into an output data flow a datum of the input data flow, belonging to the current line, and
            transferring into the output data flow at least one datum of the input data flow stored beforehand, belonging to a previous line and having a same rank in the matrix configuration as the datum transferred from the current line, and storing a datum of the input data flow belonging to the current line and not transferred into the output data flow, to replace the transferred datum, belonging to the previous line.

2. A method according to claim 1, comprising repeating the transferring and storing steps with a datum not already transferred or stored from the current line, until all the data in the current line are transferred or stored.

3. A method according to claim 1, wherein data transferred into the output data flow belong successively and alternately to a same line and to a same previous line in the matrix configuration.

4. A method according to claim 1, wherein a first half of the input data flow is transferred into the output data flow and a second half of the input data flow is not transferred into the output data flow is stored, the first half alternating with the second half.

5. A method according to claim 1, wherein the data of the input data flow transferred into the output data flow are transferred into the output data flow in groups of at least one datum alternately with groups of at least one datum stored beforehand.

6. A method according to claim 1, wherein the input data are pixels of an image in which each line comprises pixels belonging to plural color planes, the pixels being transferred into the output data flow in blocks of pixels that belong to a first one of the color planes, and the pixels stored during the transfer of a block into the output data flow belonging to a second one of the color planes that is different from the first color plane.

7. A method according to claim 6, wherein the image transmitted into the input data flow has a Bayer pixel distribution, the processing comprising transferring into the output data flow the pixels of the current line belonging to the first color plane alternately with pixels of the first color plane from the previous line stored beforehand, and the storing comprising storing the pixels of the current line belonging to the second color plane.

8. A method according to claim 7, wherein the pixels of the output data flow have a matrix configuration in which all the pixels of each line in the matrix configuration belong to a same color plane.

9. A method according to claim 1, wherein the input data are pixels of an image in which for each line all the pixels of the line belong to a single and same color plane, and the pixels of the output data flow have a Bayer distribution, the transferring comprising transferring into the output data flow, one pixel in two of the current line belonging to a first color plane, alternately with pixels stored beforehand belonging to a second color plane different than the first color plane, and the storing including storing the pixels of the current line which are not transferred into the output data flow.

10. A device for reordering input data organized according to a matrix configuration, the device comprising:
a reading unit configured to read line by line the input data having the matrix configuration to obtain an input data flow;
a storage unit configured to store data from the input data flow; and
a color reordering unit configured to process a current line of the input data flow by:
transferring into an output data flow a datum of the input data flow, belonging to the current line, and transferring into the output data flow at least one datum of the input data flow stored beforehand, belonging to a previous line and having a same rank in the matrix configuration as the datum transferred from the current line, and
causing the storage unit to store a datum of the input data flow belonging to the current line and not transferred into the output data flow, to replace the transferred datum, belonging to the previous line.

11. A device according to claim 10, wherein the storage unit has a temporary storage capacity limited to one line of data in the matrix configuration of the input data.

12. A device according to claim 10, wherein the color reordering unit includes:
a switching unit having a first input coupled to receive the input data flow, a second input coupled to an output of the storage unit, and an output configured to provide the output data flow; and
a state machine configured to cause the switching unit to alternately output data of the current line from the input data flow and data of the previous line from the storage unit.

13. A device according to claim 12, wherein the color reordering unit includes:
a pixel register having an input coupled to receive the input data flow and an output; and
a multiplexer having a first input coupled to receive the input data flow, a second input coupled to the output of the pixel register; and an output coupled to an input of the storage unit, wherein the state machine controls the storage unit and multiplexers such that pixels from a first line of the input data flow are output from the storage unit to the output data flow while pixels from a second line of the input data flow are transferred from the pixel register to the storage unit.

14. A method, comprising:
receiving an input data flow that includes successive lines of data;
storing in a buffer a first data portion of a first line of the input data flow;
transferring a first data portion of a second line of the input data flow into an output data flow;
transferring from the buffer to the output data flow the first data portion of the first line, the data of the first data portion of the second line being alternated with the data of the first data portion of the first line;
replacing in the buffer the first data portion of the first line with a second data portion of the second line in cooperation with the first data portion of the first line being transferred from the buffer to the output data flow.

15. A method according to claim 14, wherein the data of the input data flow are pixels of an image in which each line comprises pixels belonging to plural color planes, the pixels of the first data portions belong to a first one of the color planes, and the pixels of the second data portion belong to a second one of the color planes that is different from the first color plane.

16. A method according to claim 15, wherein the image has a Bayer pixel distribution and the first line is separated from the second line by a third line that includes pixels of a third color plane that is different from the first and second color planes.

17. A method according to claim 16, wherein the pixels of the output data flow have a matrix configuration in which all the pixels of each line in the matrix configuration belong to a same color plane.

18. A method according to claim 14, wherein the input data are pixels of an image in which for each line all the pixels of the line belong to a single and same color plane, and the pixels of the output data flow have a Bayer distribution.

* * * * *